No. 659,276. Patented Oct. 9, 1900.
D. WILLIAMSON.
POWER TRANSMITTER.
(Application filed Jan. 24, 1900.)
(No Model.)
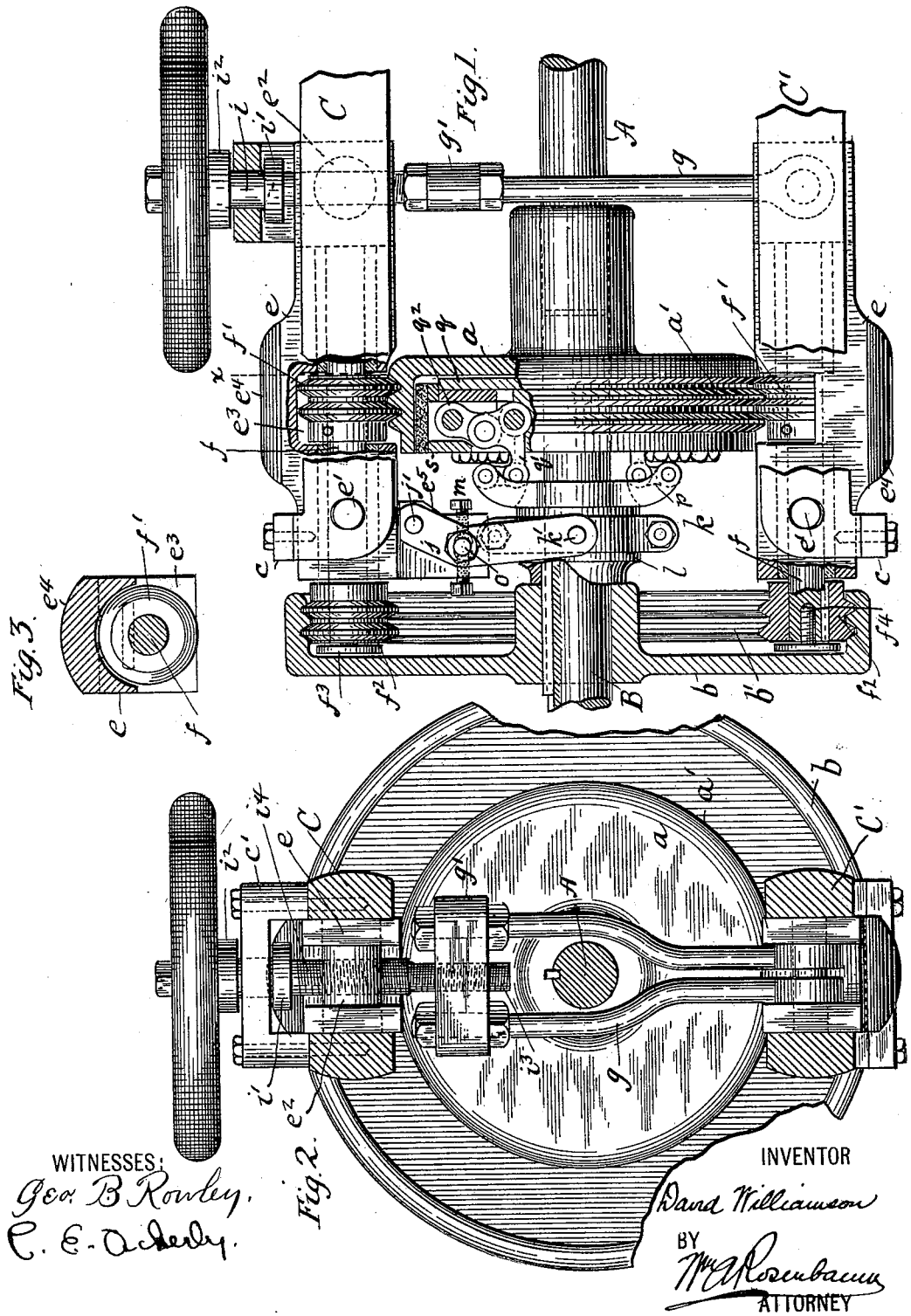
WITNESSES:
Geo. B Rowley.
C. E. Ackerly.
INVENTOR
David Williamson
BY
Wm A Rosenbaum
ATTORNEY

UNITED STATES PATENT OFFICE.

DAVID WILLIAMSON, OF NEW YORK, N. Y., ASSIGNOR OF ONE-HALF TO C. K. COOPER, SR., OF SAME PLACE.

POWER-TRANSMITTER.

SPECIFICATION forming part of Letters Patent No. 659,276, dated October 9, 1900.

Application filed January 24, 1900. Serial No. 2,631. (No model.)

*To all whom it may concern:*

Be it known that I, DAVID WILLIAMSON, a citizen of the United States, residing at the city of New York, borough of Manhattan, State of New York, have invented certain new and useful Improvements in Power-Transmitters, of which the following is a full, clear, and exact description.

This invention is a mechanical device for starting, stopping, and reversing machinery, the object being to provide a simple apparatus which will operate efficiently and be easy to manipulate for the purposes named.

The invention consists of the construction and details thereof, which will be hereinafter fully described, and pointed out in the claims.

In the accompanying drawings, Figure 1 is a side elevation, partially in section and with parts broken away, of the complete apparatus. Fig. 2 is an end elevation thereof, and Fig. 3 is a section on line $x\ x$ of Fig. 1.

Referring to the drawings by letter, A and B, respectively, represent two shafts, either one of which may be the driving-shaft and the other a driven shaft. The shafts are in line with each other, and the power from a suitable source is supposed to be transmitted through them to a working or translating apparatus. On the end of shaft A is fixed a disk $a$, having a grooved periphery $a'$. The hub of this disk has an axial socket, forming a bearing for the end of shaft B. Said shaft B carries a disk $b$, having internal grooves $b'$. Both disks are adapted to rotate with their respective shafts.

C and C' are frames supposed to be securely fastened to any fixed part, (not herein shown,) said frames being in the form of forks, their outer ends being braced by cross-pieces $c$. Between the arms of each fork is located a lever $e$, which at one end is provided with trunnions $e'$. At the other end one of the levers is provided with a nut $e^2$ free to oscillate therein. Between the trunnions and the nut an opening $e^3$ is made in each lever for the reception of a friction-pinion $f'$, which will be presently referred to. In order that the lever shall not be weakened by the opening $e^3$, it is formed with an offset portion $e^4$, bridging said opening. The lever is rectangular in cross-section, so as to fit and work nicely between the parts of the fork. The trunnions $e'$ enter slightly-elongated bearing-openings in the end of the fork, which furnish a pivotal point upon which the lever may be turned with respect to the fork. The lever is provided on each side of the opening $e^3$ with cylindrical passages or sockets, which are suitably bushed with Babbitt metal or other suitable material for a bearing-surface, and in the bearings thus formed is placed a shaft $f$, carrying the friction-pinion $f'$, which, as before stated, is located in the opening $e^3$, and another frictional pinion $f^2$, which is located on the outwardly-extending end of the shaft. The pinion $f'$ is fixed to the shaft, so that it must move with it, but has no motion, either rotary or longitudinal, independent of it. At the same time there is a slight space between the hub of this pinion and the adjacent parts of the lever, which permits the latter to move slightly in longitudinal direction to compensate for any irregularities in the structure which might prevent the pinion from making proper engagement when it is thrown into action. The pinion $f^2$ being splined to the shaft is free to move a limited extent longitudinally thereon, the limitations being provided by the head or end of the lever $e$ and the stop-disk $f^3$, which enters the outer end of the shaft and whose position may be adjusted by means of the screw $f^4$. This freedom of movement of the pinion $f^2$ permits it also to adjust itself when going into action. Pinion $f'$ is adapted to engage with the external grooves $a'$ in the periphery of $a$, while the pinion $f^2$ is adapted to simultaneously engage with the internal grooves $b'$ in the disk $b$. It is on account of this simultaneous engagement that it is necessary to provide for the self-adjustment of the parts as above described.

To provide for the simultaneous engagement of the pinions with their respective disks and the disengagement thereof, the levers $e$ are swung upon their axes formed by the trunnions $e'$, and for accomplishing this I provide means for throwing the free end of the levers $e$ toward or away from each other at will. To the end of one lever is attached a forked arm $g$, which straddles the shaft A and the members of which are connected by a cross-piece $g'$, containing a threaded passage arranged in line with the threaded passage in the nut $e^2$ of the other lever $e$. Across the forked frame C is secured a bridge-piece or bracket $c'$, through which passes a rod $i$, having collars $i'$ and $i^2$, embracing the bracket to limit longitudinal movement of the rod in the bracket. This rod is provided with right and left hand screw-threads $i^3$ and $i^4$, respectively, the former of which passes beyond the nut $e^2$ and works in the threaded passage in the cross-piece $g'$, while the thread $i^4$ engages and works in the nut $e^2$. The outer end of the rod $i$ is provided with a hand-wheel, cross-head, or other means for rotating it.

It will be seen that by rotating the rod $i$ in one direction or the other the free ends of the levers $e$ will be thrown toward or away from each other, depending upon the direction of rotation, and the pinions $f'$ and $f^2$ will be thrown into and out of engagement with the respective disks $a$ and $b$. When in engagement, the said disks will be driven in opposite directions, and if the device is built strictly as shown the speeds of the two shafts will be different; but it will be understood that I may easily arrange to have the pitch diameter of the two disks alike, and then by setting the frames C and C' at an angle and using bevel friction-gearing I can obtain the reverse rotation at various relative speeds of the shafts.

To couple the shafts together, so that they will run in the same direction, I arrange to operate a friction-clutch simultaneously with the operation of the reversing-gear described. For this purpose one of the levers $e$ is provided with an inwardly-turned lug $e^5$, upon each side of which is pivoted a lever $j$, the pivotal point being at $j'$. These levers extend along each side of the shaft B and take hold of trunnions $k'$ on a ring $k$, fitted into an annular groove in a sleeve $l$, the sleeve being splined upon shaft B. Between the pivotal points $j'$ and $k'$ the levers $j$ are confined between set-screws $m\ m$, which act upon a bolt $o$, connecting the levers and passing through a slot in the lug $e^5$. By adjusting the set-screws the normal position of the levers $j$, and consequently the longitudinal position of the sleeve $l$ upon shaft B, may be adjusted. The sleeve $l$ by moving along the shaft operates a clutch adapted to connect the shaft B with the disk $a$. This clutch may be of any approved construction, but as shown consists of the usual carrying-plate $q$, keyed to shaft B, in which is pivoted bell-cranks $q'$, one arm of which forms part of a toggle, the other part $q^2$ being connected with the shoe $s$. The bell-crank connects with sleeve $l$ by the link $p$. When the friction-pinions $f'$ and $f^2$ are thrown out of engagement with their respective disks by the swinging of the levers $e$ upon their pivot $e'$, the lug $e^5$ is thrown toward the disk $a$ and the sleeve thrown in the same direction and the clutch connecting shaft B with the disk $a$ consequently thrown into engagement, thus causing the two shafts to rotate in the same direction. It will be understood that there is sufficient freedom of movement between the parts to enable the clutch to be thrown out of engagement before the reversing-gear is thrown into engagement, thus providing for the stopping of the driven machine.

While I have described the two disks and pinions as having a frictional connection, for which V-shaped grooves are shown, it will be understood that gear-teeth if used will come within the scope of my invention.

Having described my invention, I claim—

1. In a power-transmitting device, the combination of a driving disk or wheel and a driven disk or wheel, a shaft pivotally mounted adjacent to the peripheries of said disks or wheels, said shaft carrying pinions on opposite sides of its pivot adapted to be thrown into and out of engagement with said disks or wheels respectively, and a clutching mechanism for connecting and disconnecting said disks or wheels and operated by the movement of said shaft upon its pivot, substantially as described.

2. The combination of a driving and a driven shaft axially in line with each other, two disks or wheels carried respectively by the shafts, one of which has an external gear-surface and the other an internal gear-surface, a shaft pivotally mounted adjacent to the gear-surfaces of the two disks and carrying pinions adapted to engage respectively therewith, clutch mechanism between the two shafts, connections between the pivoted shaft and the clutch whereby the clutch is operated and means for swinging the shaft on its pivot, substantially as described.

3. The combination of a driving and a driven shaft axially in line with each other, two disks or wheels carried respectively by the shafts one of which has an external gear-surface and the other an internal gear-surface, clutch mechanism between the two disks, a plurality of shafts pivotally mounted around said disks and each carrying pinions adapted to engage with the respective gear-surfaces and one of them being arranged to operate the clutch mechanism and means for swinging said shafts simultaneously to throw the corresponding gear-surfaces into and out of engagement and the clutch into and out of operation, substantially as described.

In witness whereof I subscribe my signature in presence of two witnesses.

DAVID WILLIAMSON.

Witnesses:
FRANK S. OBER,
WM. A. ROSENBAUM.